United States Patent
Moore

[11] 3,713,279
[45] Jan. 30, 1973

[54] GAS-LIQUID SEPARATOR
[76] Inventor: Lester P. Moore, P.O. Box 1762, Corpus Christi, Tex. 78401
[22] Filed: June 17, 1970
[21] Appl. No.: 46,934

Related U.S. Application Data

[63] Continuation-in-part of Ser. No. 795,531, Jan. 31, 1969, Pat. No. 3,641,745.

[52] U.S. Cl. .................. 55/319, 55/396, 55/399, 55/441, 55/452, 55/457
[51] Int. Cl. ............................................ B01d 45/16
[58] Field of Search ............... 55/318–319, 394–399, 55/392, 441, 447–448, 450, 452–453, 456–457, DIG. 22, DIG. 23

[56] References Cited

UNITED STATES PATENTS

| | | | |
|---|---|---|---|
| 1,708,653 | 4/1929 | Boyrie | 55/396 |
| 679,678 | 7/1901 | King | 55/457 X |
| 548,940 | 10/1895 | Weck et al. | 55/457 X |
| 1,471,088 | 10/1923 | Ballard | 55/319 |
| 2,659,450 | 11/1953 | Baird | 55/396 |
| 3,360,909 | 1/1968 | Barnerias | 55/457 X |
| 3,009,539 | 11/1961 | Papp | 55/452 |
| 3,386,230 | 6/1968 | Riesberg et al. | 55/457 X |
| 791,517 | 6/1905 | Walker | 55/396 |
| 1,898,608 | 2/1933 | Alexander | 55/452 |
| 2,509,267 | 5/1950 | Goodwin | 55/441 X |

FOREIGN PATENTS OR APPLICATIONS

| | | | |
|---|---|---|---|
| 15,337 | 4/1903 | Great Britain | 55/441 |
| 118,160 | 12/1939 | Sweden | 55/396 |
| 29,575 | 6/1884 | Germany | 55/463 |

Primary Examiner—Tim R. Miles
Assistant Examiner—Vincent Gifford
Attorney—Turner Moller

[57] ABSTRACT

A gas-liquid separator is provided including a first liquid removing device comprised of a conical deflector having vanes thereon for swirling an inflowing stream of gas and entrained liquids onto the interior surface of a vessel. Liquid accumulating on the interior vessel wall is removed. The flow of gas and any further entrained liquids is reversed to flow in the upstream direction and then in the downstream direction into a second liquid removing section comprised of a helical screw in a conduit. As the gas and entrained liquids are helically moved through the conduit, the further entrained liquids are deposited on the conduit wall. Means are provided to remove the subsequent liquid accumulation and to allow exit of the gas from the separator.

1 Claim, 4 Drawing Figures

INVENTOR
LESTER P. MOORE

BY *Turner Moller*

ATTORNEY

INVENTOR
LESTER P. MOORE

BY  *Turner Moller*

ATTORNEY

GAS-LIQUID SEPARATOR

This application constitutes a continuation-in-part of application, Ser. No. 795,531, filed Jan. 31, 1969, now U.S. Pat. No. 3,641,745, issued on Feb. 15, 1972.

BACKGROUND OF THE INVENTION

Two separators substantially in accordance with the copending application were installed to handle natural gas from a well near Freer, Texas. This well was connected to one of the separators to remove liquid hydrocarbons and liquid water, then to a glycol contactor to inject anhydrous glycol into the gas stream to absorb vapor phase water and then to the other separator to remove saturated glycol for regeneration. The well produces about 12,000 MCF/day at 800 psig flowing pressure at about 100° F. An analysis of the stream flowing from the well revealed that about 184 barrels of liquid hydrocarbons per day were produced.

The installed separator in accordance with the copending application was 12 inches O.D. and 10 feet long. About 170 barrels of liquid hydrocarbons per day were recovered from the first separator. In order to keep the glycol system charged with glycol, it was necessary to add about 40 gallons of glycol per day. This indicated that about 40 gallons of glycol per day was being lost through the second separator. This performance was not deemed satisfactory and the installed separators were replaced by a pair of conventional 30 inch O.D. by 12 feet high vertical separators. The upstream prior art separator recovered about 184 barrels of liquid hydrocarbons per day. To keep the glycol system charged, about 1 gallon of glycol per day was added thereto.

Although the separator of the copending application has performed satisfactorily at lower flow rates, it is apparent that improvements are required to accommodate high flow rates with a small vessel. The separators in accordance with the copending application were removed from the well and modified in accordance with one embodiment of this invention. The modified separators were reconnected to the well, replacing the conventional 30 inch O.D. separators. At flow rates of 12,000 MCF/day, 184 barrels of liquid hydrocarbons were recovered from the upstream separator. Glycol loss has been limited to less than a gallon per day. It is accordingly apparent that the separator of this invention operates substantially better at high flow rates than that of the copending application and equivalent to the prior art separators when operating at their design capacity. This is of particular importance when it is considered that the overall dimensions of the separator of this invention are substantially less that that of the prior art separators.

One of the major defects in conventional prior art separators is the inability to efficiently remove liquids at flow rates in excess of design capacity. The conventional prior art separator is a vertical unit and is sufficiently large to reduce the velocity of the stream passing therethrough to less than about 5 feet/second. The inlet to the separator is typically about 40 percent down from the vessel top with the outlet at the vessel top. The gas flow path is upwardly to the top while liquid droplets fall by gravity into the bottom of the separator. When the flow velocity through the separator exceeds 5 feet/second, a substantial amount of liquid is carried over into the gas outlet and is lost.

The inability of the prior art separators to operate efficiently in excess of design velocity becomes important under several circumstances. The first occurs when a substantially greater volume is produced from the well at the original design pressure. This may occur during winter months when gas wells are produced at high rates to meet demand. The second circumstance occurs after a typical well has produced for a substantial length of time and the pressure of gas produced from the well has fallen significantly. Typically, low pressure gas wells deliver to a low pressure gathering line on which a compressor has been installed to increase the pressure of gas flowing therethrough for delivery to a high pressure line. When the gas wells are thus connected to a low pressure line, they are again capable of producing near capacity amounts of gas but at a substantially lower pressure. In this situation, the flow velocity through the conventional separator will be far in excess of the design velocity. In each of these circumstances, the flow velocity will be in excess of the design velocity thereby causing inefficient operation. To provide efficient operation, the conventional separator must be replaced by a separator of larger capacity.

The separator of this invention utilizes gas at high velocities to create large centrifugal forces to separate the liquid from the stream. Consequently, a vessel of any given size is able to efficiently separate liquids at widely varying flow rates. For example, in the well previously mentioned, liquid has been efficiently separated at flow rates varying between 1,000 and 12,000 MCF/day. The maximum capacity of the installed separator is unknown under the conditions existing at the well. Design calculations indicate, however, that a separator of the size installed operating at 1,000 psia with a 15 psi pressure drop and an 80° F. well stream should separate 158,000 MCF/day.

SUMMARY OF THE INVENTION

It is an object of this invention to provide a separator for removing entrained liquid from a flowing gas stream characterized by high liquid recovery and low pressure drop through the separator.

Another object of this invention is to provide a separator for removing entrained liquid from a flowing gas stream utilizing high flow velocities to generate sizeable centrifugal forces to separate the liquid.

Another object of the invention is to provide a tandem gas-liquid separator comprised of a conical deflector adjacent the inlet for deflecting a gas-liquid stream onto the interior vessel wall, a helical screw downstream of the conical deflector for removing further entrained liquids and means substantially increasing the transit time of the gas stream in the separator comprised of means for reversing the flow of gas through a substantial part of the separator.

In summary, this invention comprises an elongate vessel having a liquid collecting chamber therein, an inlet conduit and means providing a liquid outlet from the chamber; a conical deflector in the chamber spaced from the vessel wall with its conical axis aligned with the inlet conduit for deflecting an inflowing stream of gas and entrained liquid outwardly toward the interior vessel wall and thereby depositing liquid thereon for removal through the liquid outlet; means in the chamber for reversing the flow of gas from a first path adjacent the vessel wall flowing in the downstream direction to a second path spaced from the vessel wall flowing in the upstream direction to a third path spaced from the vessel wall flowing in the downstream direction, the flow reversing means comprising a closed shell having an inlet adjacent the downstream end of the chamber and conduit means extending into the shell having an inlet upstream of the shell inlet wherein the conduit means extends out of the chamber; helical means in the conduit means for swirling the gas and thereby centrifugally depositing any entrained liquid therein onto the interior wall thereof; means for removing liquid from the interior wall of the conduit means and outlet means for discharging the gas from the conduit means and the vessel.

DETAILED DESCRIPTION OF THE PREFERRED EMBODIMENTS

Figure 1:
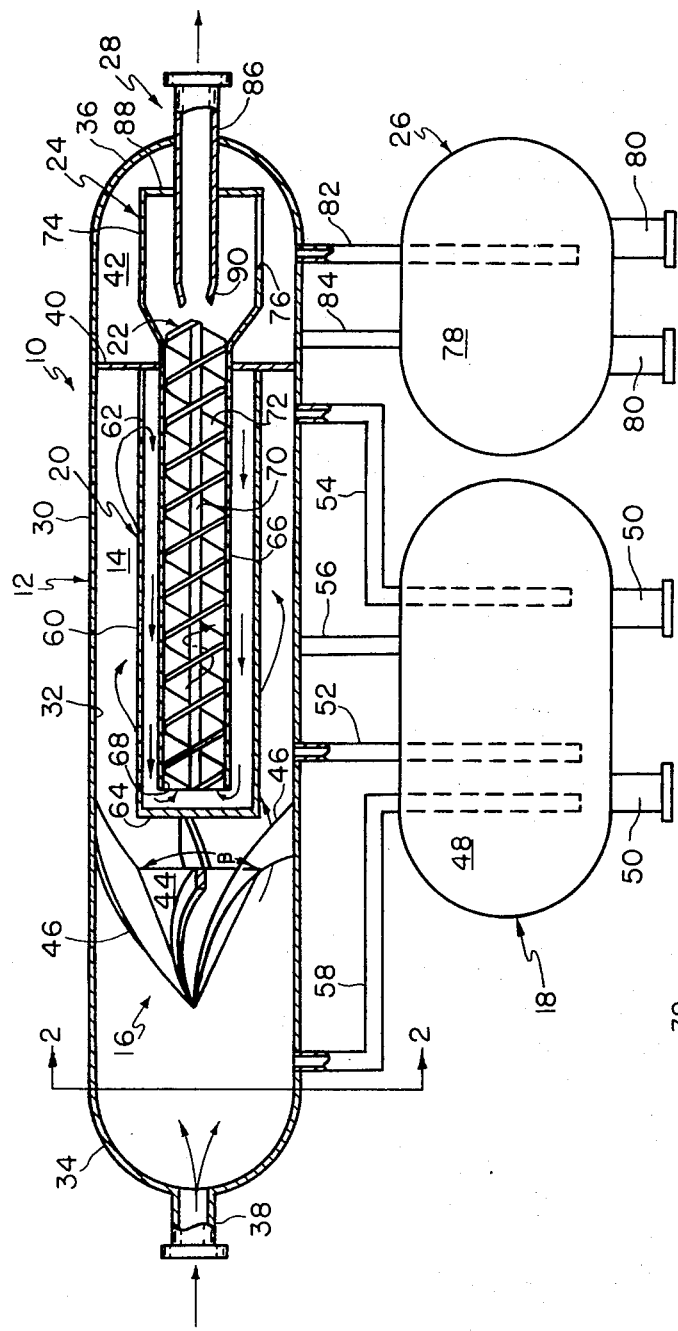
FIG. 1 is a cross sectional view of one embodiment of the separator of this invention.
Figure 2:
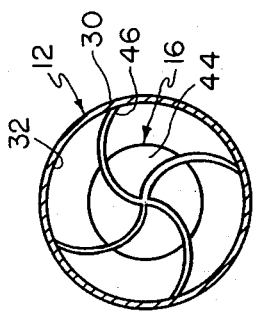
FIG. 2 is a cross sectional view of the embodiment of FIG. 1 taken substantially along line 2—2 thereof as viewed in the direction indicated by the arrows.

Attention is directed to FIG. 1 wherein there is shown a gas-liquid separator 10 having as major components a vessel 12 providing a liquid collecting chamber 14 therein, a conical deflector 16 comprising a first liquid removing device, a vessel 18 for temporarily storing liquid removed from the chamber 14, flow reversing means 20 for substantially increasing the transit length of fluids flowing through the separator 10, helical means 22 comprising a second liquid removing device, means 24 for removing liquid from the second liquid removing device, a vessel 26 for temporarily storing liquids removed from the second liquid removing device and gas outlet means 28. The inflowing stream of gas and entrained liquids is deflected and swirled by the conical deflector 16 to deposit liquid on the interior wall of the vessel 12. Liquid so deposited passes into the vessel 18 for subsequent removal. Gas and further entrained liquid is reversed in movement by the flow reversing means 20 and passes into the helical means 22. Any further entrained liquid is deposited on the wall of the conduit embracing the helical means 22 and is removed therefrom by the liquid removing means 24 into the vessel 26 for subsequent handling. The gas passing through the separator 10 exits through the gas outlet means 28 to a pipeline for subsequent sale or use.

The vessel 12 is illustrated as comprising a cylindrical section 30 having an interior wall 32, hemispherical end caps 34, 36 and an inlet conduit 38 opening into the chamber 14. A partition 40 divides the vessel 12 into the liquid collecting chamber 14 and a quiescent zone 42, the function of which will be pointed out more fully hereinafter. Although the vessel 12 may be of any size necessary to accommodate the volume of fluid passing through the separator 10, it has been found that a 12 inch O.D. vessel with a 6 inch screw will accommodate up to 15,000 MCF/day at 1,000 psia working pressure with an insignificant pressure drop.

The conical deflector 16 comprises a cone 44 converging toward the inlet 38 and coaxial therewith. The cone 44 is preferably slightly spaced from the inlet 38. Although the cone angle $\beta$ may vary widely, a 45° angle cone has been found advantageous. The conical deflector 16 also comprises a plurality of vanes 46 converging at the cone apex and having the outer ends thereof secured, as by welding or the like, to the interior vessel wall 32. It will be apparent that the conical deflector 16 acts to deflect the incoming stream of gas and entrained liquid outwardly to deposit the entrained liquids on the interior vessel wall 32. The vanes 46 are configured to swirl the incoming stream thereby increasing the transit length of the gas-liquid stream, generating significant centrifugal forces and exposing the liquid to greater surface area for deposition thereon. The vanes 46 may be considered spiral even though the leading ends thereof are substantially straight.

The vessel 18 comprises an intermediate transfer station for liquid accumulating in the chamber 14 at the elevated pressure of the flowing gas stream to a conventional tank operating at atmospheric pressure or nearly so. The vessel 18 accordingly comprises a pressure vessel 48 supported in any suitable manner, as by legs 50. A pair of conduits 52, 54 open into the chamber 14 to remove liquid which is deposited on the interior wall 32 and which gravitates toward the bottom of the vessel 12. A pressure equalizing conduit 56 connects the vessel 48 and the chamber 14, away from the bottom thereof. As the vessel 48 fills, gas above the liquid surface may pass through the pressure equalizing conduit 56 into the chamber 14.

An important part of the vessel 18 comprises a conduit 58 opening into the chamber 14 upstream of the conical deflector 16. It often happens that a gas-condensate well produces liquid hydrocarbons in slugs rather than as droplets. In this event, it is desirable to remove the liquid before the stream passes across the conical deflector 16. Accordingly, the conduit 58 opens into the chamber 14 no farther downstream than the midpoint of the cone 44. Preferably, the conduit 58 opens into the chamber 14 upstream of the cone 44.

An important part of this invention is the flow reversing means 20 which allows the transit length of fluid flowing through the separator 10 to be increased substantially beyond the overall physical length of the vessel 12. The flow reversing means 20 comprises an enclosed shell 60 having an inlet 62 adjacent the downstream end of the chamber 14. The shell 60 is conveniently a pipe coaxial with the cylindrical section 30 to define a first flow path therebetween for the gas-liquid stream. The downstream end of the shell 60 is conveniently sealed, as by welding or the like, to the partition 40 while the upstream end thereof is closed by a cap 64.

The flow reversing means 20 further comprises conduit means 66 disposed within the shell 60 and is preferably concentric therewith to define a second flow path therebetween leading from the downstream end of the chamber 14 toward the upstream end thereof. The conduit means 66 has an inlet 68 upstream of the shell inlet 62 and defines a third flow path in the center of the vessel 12 leading in the downstream direction. The conduit means 66 is sealed as by welding or the like, to the partition 40 to avoid gas bypass around the helical means 22.

It will accordingly be seen that the flow reversing means 20 substantially increases the transit length of fluid passing through the separator 10 and substantially increases the surface area exposed to the flow stream without significantly increasing the overall length of the separator 10. It is apparent that the surface area exposed to the flow stream may be increased merely by lengthening the separator without using the flow reversing means 20. Equally apparent, the advantage of the flow reversing means 20 is dependent upon the extent of flow reversal. The length of the second flow path between the shell 60 and the conduit means 66 is desirably at least 20 percent of the overall length of the cylindrical section 30 and preferably is in the neighborhood of 40 percent thereof.

Any liquid deposited on the external surface of the shell 60 gravitates downwardly and is removed through the conduits 52, 54. Liquid deposited on the interior surface of the shell 60 or on the exterior surface of the conduit means 66 ultimately passes through the conduit means 66 for removal through the liquid removing means 24 and the vessel 26.

The helical means 22 is positioned within the conduit means 66 and preferably comprises a rod 70 to which is secured a helical vane or screw 72. Although the embodiment of FIG. 1 shows that the screw 72 makes a multiplicity of turns about the rod 70, the exact number of turns may vary in accordance with the amount of liquid entrained in the liquid stream, the volume passing through the separator 10 and other parameters as will be apparent to those skilled in the art. In general, less than ten turns are needed and four to eight turns are typical. As the gas-liquid stream passes through the helical means 22, the stream is swirled to centrifugally deposit liquid on the internal surface of the conduit means 66. The liquid passes around the turns of the vane 72 and exits therefrom in an enlarged section 74 of the conduit means 66.

The liquid removing means 24 comprises the enlarged section 74 which has an elongate slot 76 therein to allow liquid exiting from the helical means 22 to pass into the quiescent zone 42. In the alternative, a plurality of perforations may be provided in the section 74 to discharge liquid into the quiescent zone 42.

The vessel 26, much like the vessel 18, is a temporary transfer facility to discharge liquids into a storage vessel operating at substantially atmospheric pressure. The vessel 26 accordingly comprises a pressure vessel 78 supported in any suitable manner, as by the provision of legs 80. A liquid outlet conduit 82 opens into the quiescent zone 42 adjacent the bottom thereof while a pressure equalizing conduit 84 opens into the zone 42 above the bottom thereof.

The gas outlet means 28 comprises an outlet conduit 86 sealed, as by welding or the like, to the end cap 36 and to a cap 88 closing the end of the section 74. The upstream end 90 of the conduit 86 is preferably swaged down slightly in an effort to minimize liquid passage through the outlet conduit 86.

The embodiment of FIG. 1 has been used under operating conditions to separate liquid hydrocarbons, water and glycol from the well previously mentioned. At all flow rates, the bulk of liquid removed from the separator 10 has been through the vessel 18. This is in contrast to the separator of the copending application where the bulk of the recovered liquid was through the second vessel at high flow rates and through the first vessel at low flow rates.

In the operation of the device, inflowing gas and liquid passes through the inlet 38 with any liquid slugs being immediately removed through the conduit 58. Gas and entrained liquid passes over he conical deflector 16 and is swirled to centrifugally deposit liquid on the internal surface 32 of the vessel 12. Liquid so deposited gravitates toward the bottom of the chamber 14 and is removed through the conduits 52, 54. The flow reversing means 20 reverses the flow of gas and entrained liquid from the first flow path between the cylindrical section 30 and the shell 60 flowing in the downstream direction to the second flow path between the shell 60 and the conduit means 66 flowing in the upstream direction. The end cap 64 acts to reverse the flow again into the third flow path flowing in the downstream direction in the conduit means 66.

The flow stream passing through the conduit means 66 is swirled so that liquid therein is deposited on the interior wall thereof. Liquid so deposited passes along the helical path in the conduit means 66 and exits into the enlarged section 74, passes through the slot 76 into the quiescent zone 42 and is withdrawn through the outlet 82 into the vessel 26. Gas exiting from the helical means 22 passes through the upstream end 90 of the outlet conduit 86 and then passes into a pipeline for ultimate sale or use.

It will be readily seen that the flow reversing means 20 effectively increases the transit time and length of fluid travel through the separator 10.

Figure 3:
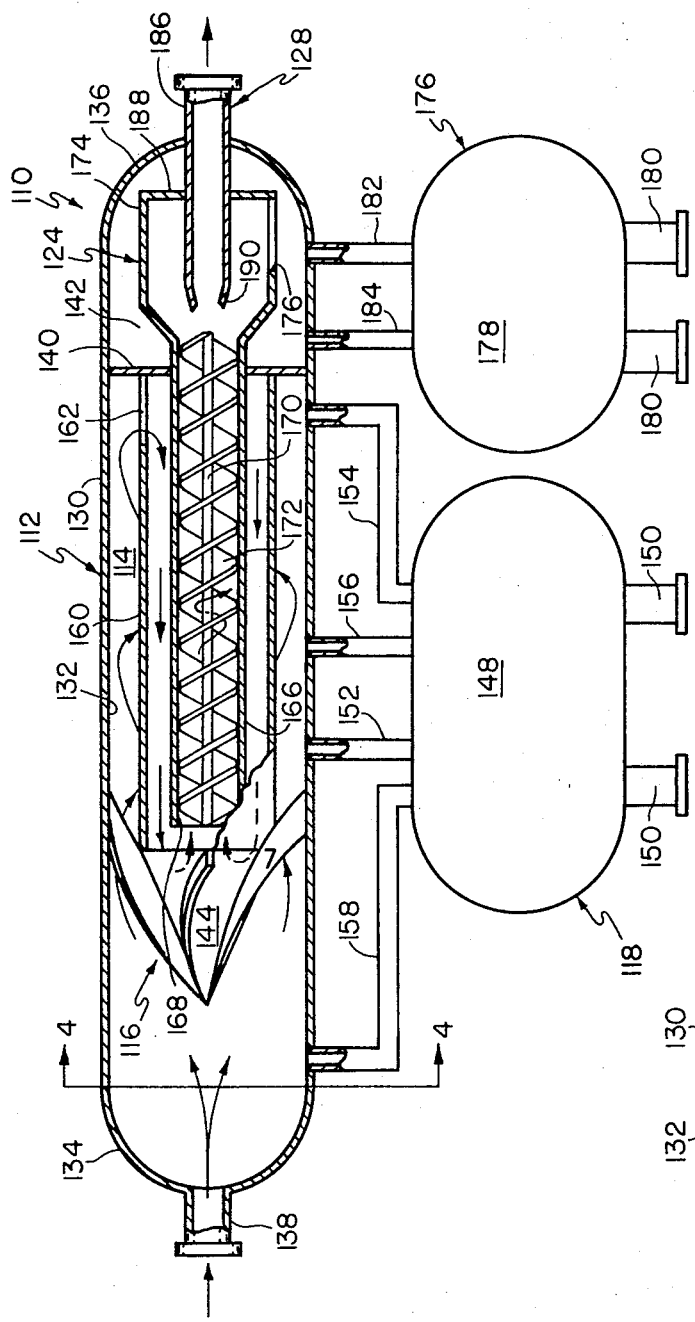
FIG. 3 is a cross sectional view of another embodiment of this invention illustrating the conical deflector being connected to the flow reversing means.
Figure 4:
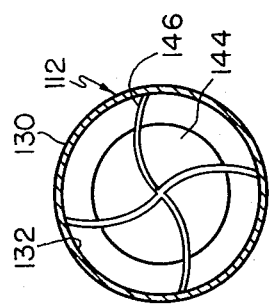
FIG. 4 is a cross sectional view of the embodiment of FIG. 3 taken substantially along line 4—4 thereof.

Referring now to the embodiment of FIGS. 3 and 4, there is illustrated another gas liquid separator made in accordance with this invention. For purposes of brevity, analagous reference characters are used with only the differences between the embodiments 10, 110 being specifically discussed. In the embodiment of FIG. 1, the end cap 64 of the shell 60 is illustrated as spaced downstream from the cone 44. In order to further increase the transit length through the separator 110, and/or to decrease the overall length of the vessel 112, the left most end of the shell 160 is welded or otherwise secured to the base of the cone 144. Consequently, the end cap 64 may be wholly deleted and the interior surface of the cone 144 may be used to reverse fluid movement into the conduit means 166.

The conduits 152, 154, 156, 158 may, in the alternative, terminate at the top of the vessel 148. Conventional separators having a plurality of liquid outlets extend the analagous conduits to the bottom of the intermediate storage vessel to minimize gas bypassing the separator elements. This has proved unnecessary with this invention and that of the copending application since the pressure drop between the upstream and downstream ends of the chamber 114 is very small. The equalizing pipe 156 may open into the bottom of the vessel 112 since the capacity of the outlet conduits 152, 154, 156, 158 typically exceeds the flow capacity of the inlet 138. The outlet conduits 182, 184 may similarly open into the top of the vessel 178 and into the bottom of the quiescent zone 142.

Fabrication of the separator 110 is substantially easier than fabrication of the separator 10 as will be apparent to those skilled in the art. In addition to omitting the end cap 64, the cone 144 is substantially easier to install. Operation of the separator 110 is substantially the same as operation of the separator 10.

It is accordingly apparent that there is herein provided an improved gas-liquid separator having all of the advantages of this invention which is pointed out in the claims appended hereto.

I claim:

1. A separator for removing entrained liquids from a moving gas stream comprising an elongate vessel having a liquid collecting chamber therein, an inlet conduit opening into the chamber and means providing a liquid outlet from the chamber;

a conical deflector in the chamber spaced from the vessel wall with its conical axis aligned with the inlet conduit, the deflector converging toward the inlet conduit and having a plurality of vanes on the upstream end thereof for deflecting and swirling an inflowing stream of gas and entrained liquid outwardly toward the vessel wall and thereby depositing liquid thereon for removal through the liquid outlet;

means between the deflector and the inlet conduit opening for removing liquid slugs before swirling the stream;

means in the chamber for reversing the flow of gas and liquid entrained therein from a first horizontal path adjacent the vessel wall flowing in the downstream direction through a second horizontal, unobstructed path spaced from the vessel wall flowing in the upstream direction to a third horizontal path spaced from the vessel wall flowing in the downstream direction, the flow reversing means comprising a closed shell having an inlet adjacent the downstream end of the chamber and conduit means extending into the shell having an inlet upstream of the shell inlet, the conduit means extending out of the chamber;

helical means inside the conduit means and within the shell confines for swirling the gas and thereby centrifugally depositing any entrained liquid therein onto the interior wall thereof;

means for removing liquid from the interior wall of the conduit means; and outlet means for discharging the gas from the conduit means and the vessel.

* * * * *